US009031748B2

(12) United States Patent
Sakai

(10) Patent No.: US 9,031,748 B2
(45) Date of Patent: May 12, 2015

(54) GRILLE SHUTTER OPENING/CLOSING CONTROL DEVICE

(75) Inventor: Morio Sakai, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 33 days.

(21) Appl. No.: 13/991,726

(22) PCT Filed: Nov. 25, 2011

(86) PCT No.: PCT/JP2011/077153
§ 371 (c)(1),
(2), (4) Date: Jun. 5, 2013

(87) PCT Pub. No.: WO2012/077509
PCT Pub. Date: Jun. 14, 2012

(65) Prior Publication Data
US 2013/0275009 A1 Oct. 17, 2013

(30) Foreign Application Priority Data

Dec. 10, 2010 (JP) ................................. 2010-275580

(51) Int. Cl.
*B60K 11/08* (2006.01)
(52) U.S. Cl.
CPC ........... *B60K 11/085* (2013.01); *B60Y 2200/92* (2013.01); *B60Y 2306/09* (2013.01)
(58) Field of Classification Search
CPC ... B60K 11/085; B60K 11/08; B60Y 2200/92
USPC .......................................................... 701/49
See application file for complete search history.

(56) References Cited

U.S. PATENT DOCUMENTS

2005/0288840 A1* 12/2005 Suzuki ............................ 701/49
2006/0137248 A1*  6/2006 Ichinose ......................... 49/340

(Continued)

FOREIGN PATENT DOCUMENTS

DE   10 2009 052 372 A1   5/2011
EP       2 248 693 A2    11/2010

(Continued)

OTHER PUBLICATIONS

U.S. Appl. No. 13/991,704, filed Jun. 5, 2013, Sakai.

(Continued)

*Primary Examiner* — John Q Nguyen
*Assistant Examiner* — Kyung Kim
(74) *Attorney, Agent, or Firm* — Oblon, McClelland, Maier & Neustadt, L.L.P.

(57) ABSTRACT

A shutter opening/closing control device is proposed which can reduce an operation noise of the shutter without increasing the manufacturing cost. The shutter opening/closing control device includes a grille shutter for opening and closing a grille opening which introduces the outside air into the engine compartment, a shutter opening and closing operating portion having a drive source for operating the shutter to be open or to be closed, a closing operation judging portion for judging whether or not the grille shutter is operated in a closing direction based on the vehicle information and a drive source torque controlling portion for controlling the drive source of the shutter opening and closing operating portion to operate the shutter by a low torque when the grille shutter is operated in a closing direction under the engine being stopped. The low torque is lower than a high torque by which the drive source operates the grille shutter in an opening direction.

9 Claims, 8 Drawing Sheets

(56) References Cited

U.S. PATENT DOCUMENTS

2010/0243351 A1 9/2010 Sakai
2010/0282533 A1* 11/2010 Sugiyama .................... 180/68.1

FOREIGN PATENT DOCUMENTS

| | | |
|---|---|---|
| FR | 2 943 001 A1 | 9/2010 |
| JP | 5 50861 | 3/1993 |
| JP | 2007 2816 | 1/2007 |
| JP | 2008 6855 | 1/2008 |
| JP | 2008 37334 | 2/2008 |
| JP | 2010 247819 | 11/2010 |

OTHER PUBLICATIONS

International Search Report issued Feb. 14, 2012 in PCT/JP11/077153 filed Nov. 25, 2011.
Extended European Search Report issued Nov. 22, 2013 in Patent Application No. 11846181.3.

* cited by examiner

US 9,031,748 B2

GRILLE SHUTTER OPENING/CLOSING CONTROL DEVICE

TECHNICAL FIELD

This invention relates to an opening/closing control device for a grille shutter which controls opening and closing of a grille opening provided at a front portion of a vehicle.

BACKGROUND OF THE TECHNOLOGY

In a vehicle, a grille opening is provided at a front face of the vehicle for introducing outside air to the front side of a radiator installed in an engine compartment of the vehicle. A grille shutter is provided at the grille opening for opening or closing the grille opening to allow or interrupt the introduction of the outside air into the engine compartment. As such conventional devices, the Patent Documents 1 and 2 disclose conventional technology for such devices.

DOCUMENT LIST OF STATE OF ART

Patent Document

Patent Document 1: JP2008-6855 A
Patent Document 2: JP1993-50861 A

DISCLOSURE OF INVENTION

Problems to be Solved

According to the above type grille shutter opening/closing device, the operation noise is generated when the fins of the shutter contact the frame of the opening at the closing ends thereof and the noise is transmitted to the frame of the vehicle which gives the occupant in the vehicle an unpleasant feeling. Particularly, such noise may annoy the occupant of the HV (Hybrid Vehicle) with a low running noise.

In order to reduce such operation noise, in a conventional device, a cushioning material was provided at the noise transmitting portion, such as fins of the shutter to block the noise transmission. However, according to such structure, the manufacturing cost increases due to the addition of material and another issue arises that the deterioration with age of the cushioning material reduces the effect of noise blocking.

Accordingly, this invention was made considering the above conventional drawbacks and it pertains to a grille shutter opening/closing control device which can reduce an operation noise generated at the time of closing operation of the grille shutter without increasing any manufacturing cost.

In order to solve the above problems the feature of the invention is characterized in that the device of the invention is applied to a vehicle with an engine or a hybrid vehicle with an engine and a hybrid motor and is comprised of a grille shutter for opening and closing a grille opening through which the air is introduced into an engine compartment of the vehicle, a shutter opening/closing operating portion with a drive source for operating the grille shutter to open and close, a closing operation judging portion for judging whether the grille shutter is to be closed or not based on a vehicle information and a drive source torque controlling portion for controlling the drive source of the shutter opening/closing operating portion to operate the grille shutter by a low torque when the grille shutter is judged to be operated in a closing direction under the engine being stopped. The low torque is lower than a high torque by which the grille shutter is operated when the grille shutter is judged to be operated in an opening direction by the closing operation judging portion.

THE EMBODIMENTS FOR IMPLEMENTING THE INVENTION

Figure 1:
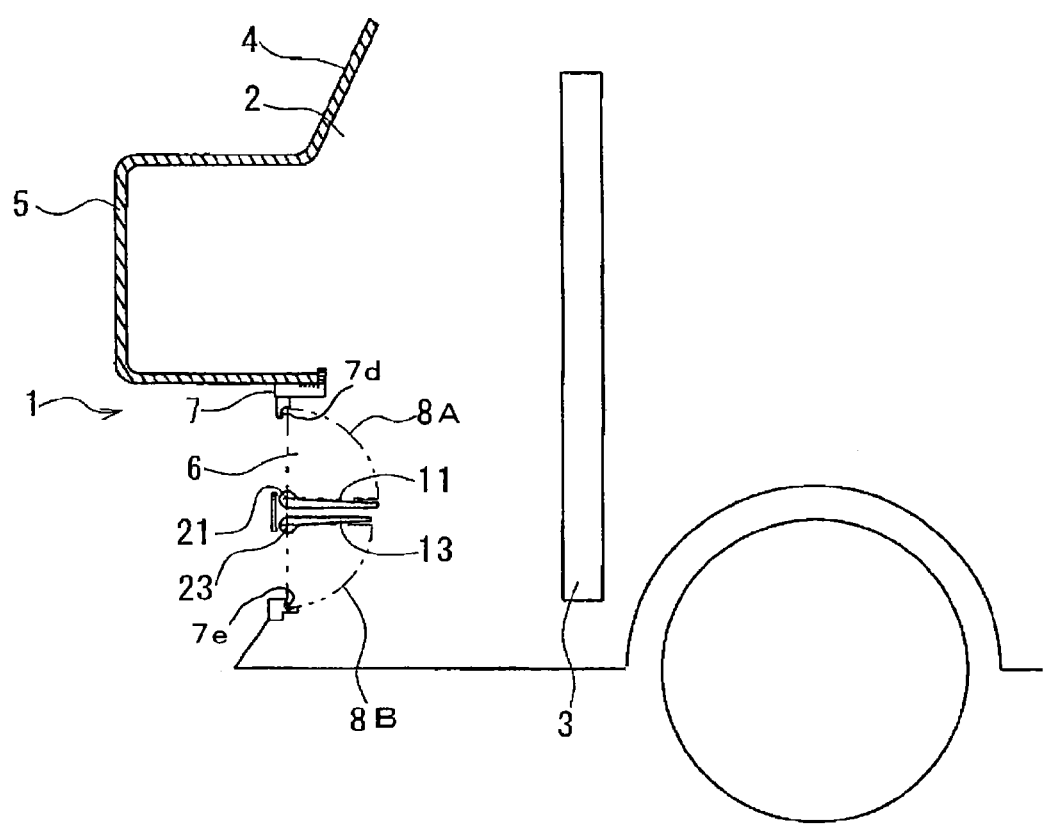
FIG. 1 is a schematically illustrated cross sectional view of a grille shutter of an embodiment of the invention showing an assembled state into an engine compartment of a vehicle.

The embodiments of the invention will be explained with reference to the attached drawings. FIG. 1 shows a schematically illustrated grille shutter of an embodiment of the invention showing an assembled state into an engine compartment 2 of a vehicle. A radiator 3 is housed in the engine compartment for cooling the coolant of the engine and is attached to a vehicle body 4. A grille opening 6 is provided at a lower side of the vehicle body under a bumper 5. The opening 6 faces to the front side at lower portion of the radiator 3. A grille shutter 1 is provided in the opening 6 for opening and closing the grille opening 6.

Figure 2:
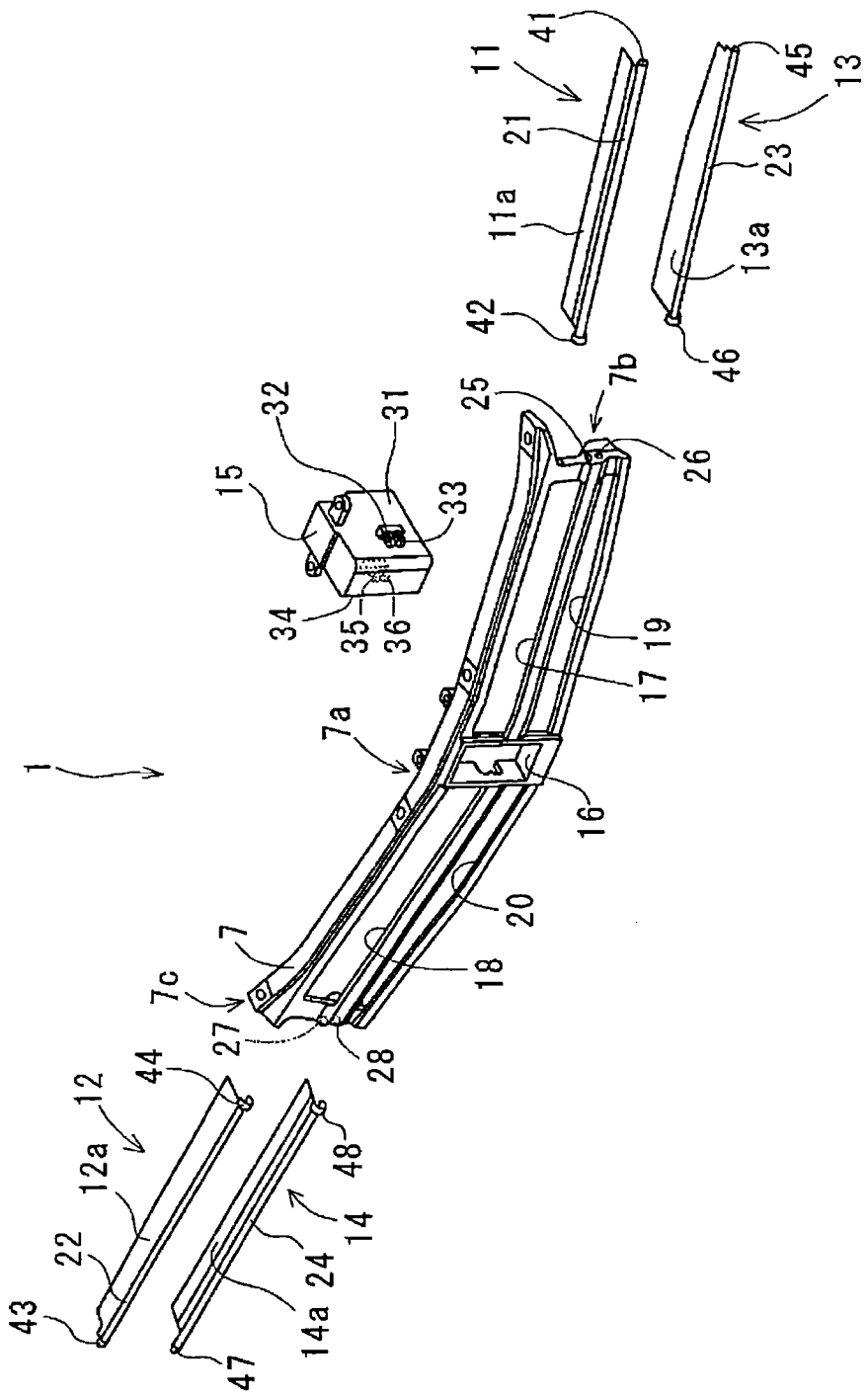
FIG. 2 shows an exploded perspective view of the grille shutter of the embodiment showing an overall structure.

As shown in FIG. 2, the grille shutter 1 is provided with a base frame 7 arranged at the grille opening 6, a plurality of fins 11 through 14 (in this embodiment, the number of fins is four) and an actuator 15 as a shutter opening/closing portion with a motor 60 (see FIG. 4) as a drive source. The base frame 7 is formed to be of an elongated shape extending in a vehicle width direction and a central portion 7a thereof in the extending direction is most closely positioned in a vehicle front side direction. Both sides 7b and 7c of the base frame 7 in the extending direction are bent to be off-set in a vehicle rear side direction from the position of the central portion 7a. An actuator attaching portion 16 is provided at the central portion 7a for attaching the actuator 15 therein. A plurality of fin attaching portions 17 through 20 corresponding to the first fin 11, the second fin 12, the third fin 13 and the fourth fin 14 is provided at both sides in the vehicle width direction relative to the actuator attaching portion 16. The fin attaching portions 17 through 20 are arranged at the both sides, each of the two portions 17, 19; 18, 20 being in parallel to each other in an up/down direction.

The first fin 11 includes a first supporting linear shaft 21 extending in a vehicle width direction and a fin portion 11a integrally formed with the first linear shaft 21. Similarly, the second fin 12 includes a second supporting linear shaft 22 extending in a vehicle width direction and a fin portion 12a integrally formed with the second linear shaft 22, the third fin 13 includes a third supporting linear shaft 23 and a fin portion 13a integrally formed with the third linear shaft 23 and the fourth fin 14 includes a fourth supporting linear shaft 24 and a fin portion 14a integrally formed with the fourth linear shaft 24, respectively.

One end portion 7b in a vehicle width direction (right side as viewed in FIG. 2) of the base frame 7 is provided with a first holding portion 25 for holding the first supporting shaft 21 of the first fin 11 and a third holding portion 26 for holding the third supporting shaft 23 of the third fin 13. The other end portion 7c in a vehicle width direction (left side as viewed in FIG. 2) of the base member 7 is provided with a second holding portion 27 for holding the second supporting shaft 22 of the second fin 12 and a fourth holding portion 28 for holding the fourth supporting shaft 24 of the fourth fin 14. A first output shaft 32 and a third output shaft 33 are provided at a right side surface 31 of the actuator 15 and a second output shaft 35 and a fourth output shaft 36 are provided at a left side surface 34 of the actuator 15.

Figure 3:
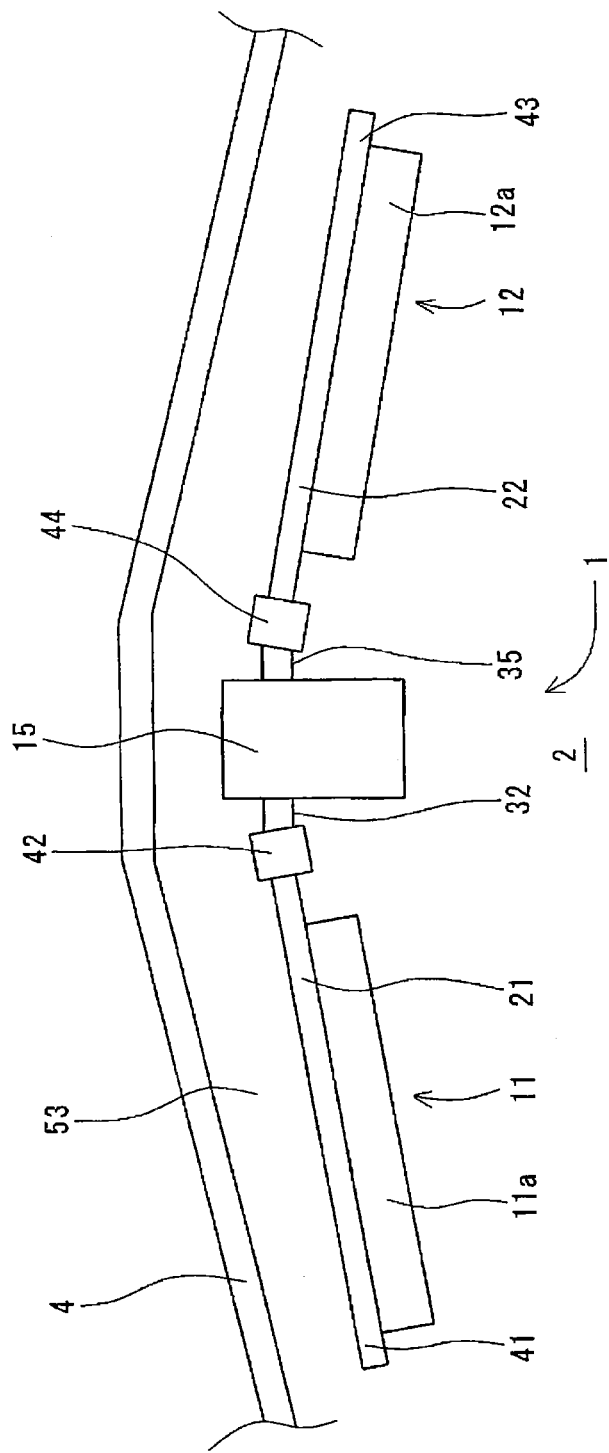
FIG. 3 is a plane view of the grille shutter of the embodiment.

One tip end 41 of the first supporting shaft 21 of the first fin 11 is rotatably supported on the first holding portion 25 and the other tip end 42 of the first supporting shaft 21 is rotatably connected to the first output shaft 32 as viewed in FIG. 3. Similarly, one tip end 43 of the second supporting shaft 22 of the second fin 12 is rotatably supported on the second holding portion 27 and the other tip end 44 of the second supporting shaft 22 is rotatably connected to the second output shaft 35, the one tip end 45 of the third supporting shaft 23 of the third fin 13 is rotatably held on the second holding portion 26 and the other tip end 46 is rotatably connected to the third output shaft 33 and the one tip end 47 of the fourth supporting shaft 24 is rotatably held on the fourth holding portion 28 and the other tip end 48 is rotatably connected to fourth output shaft 36. The first and the second fins 11 and 12 are arranged with the third and the fourth fins 13 and 14 facing to one another and operated to open/close symmetrically relative thereto (see two dotted chain lines 8A and 8B in FIG. 1).

Figure 4:
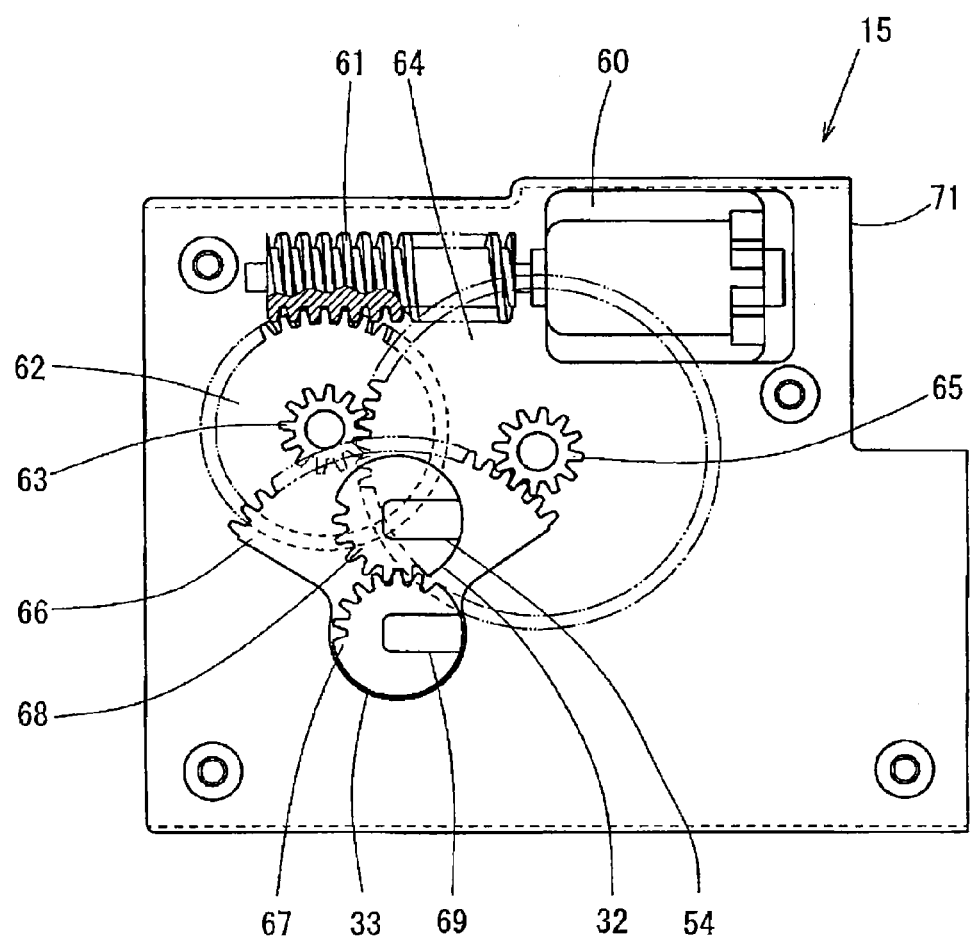
FIG. 4 is a view showing the grille shutter opening/closing operating portion.

As shown in FIG. 4, the actuator 15 is provided with a housing 71 and a motor 60 as the drive source is housed in the housing 71. An output shaft of the motor 60 is connected with a worm gear 61 which is in engagement with a worm wheel 62. A first pinion gear 63 is integrally and coaxially formed with the worm gear 62. The first pinion gear 63 is engaged with a gear 64 and a second pinion gear 65 is integrally and coaxially formed with the gear 64. The second pinion gear 65 is engaged with a sector gear 66. A second output gear 67 is integrally and coaxially formed with the sector gear 66 and a first output gear 68 is engaged with the second output gear 67 at an upper portion of the second output gear 67.

When the motor 60 thus structured is rotated forwardly and reversely, the second output gear 67 is rotated in one direction through the worm gear 61, worm wheel 6, first pinion gear 63, gear 64, second pinion gear 65 and sector gear 66 and at the same time the first output gear 68 is rotated in the opposite direction to the second output gear 67 through the second output gear 67.

The first and the second output gears 68 and 67 are provided with one pair each in the rotation shaft direction relative to the worm wheel 62, gear 64 and the sector gear 66. The each of the pair of first output gears 68 is connected to the first and the second output shafts 32 and 35, respectively. Each tip end of the first and the second output shafts 32 and 35 is provided with a projection 54 with a width across flat, respectively and each tip end of the third and the fourth output shafts 33 and 36 is provided with a projection 69 with a width across flat, respectively.

The projections 54 with width across flats formed on the first and the second output shafts 32 and 35 are not shown in the attached drawings, but these projections 54 are to be engaged with recessed portions formed at the other tip ends 42 and 44 of the first and the second supporting shafts 21 and 22 of the first and the second fins 11 and 12 thereby rotatably connecting the first and the second output shafts 32 and 35 with the first and the second supporting shafts 21 and 22.

Similarly, the projections 69 with the width across flats formed on the third and the fourth output shafts 33 and 36 are to be engaged with recessed portions formed at the other tip ends 46 and 48 of the third and the fourth supporting shafts 23 and 24 of the third and the fourth fins 13 and 14 thereby rotatably connecting the third and the fourth output shafts 33 and 36 with the fourth supporting shafts 23 and 24.

According to thus structured embodiment, each first output gear 68 and each second output gear 67 are rotated oppositely to each other by the motor 60 of the actuator 15. Therefore, the supporting shafts 21 and 22 of the first and the second fins 11 and 12 are rotated oppositely with the rotation of the supporting shafts 23 and 24 of the third and the fourth fins 13 and 14 to open or close the grille opening 6 by the operation of the grille shutter 1. When the grille shutter 1 is under closing operation, the grille opening 6 is closed by the contact of the fins 11 through 14 with the each end surface 7d and 7e of the base frame 7 (see FIG. 1). Accordingly, if the speed of the closing operation of the fins 11 through 14, an operation noise may be generated.

The shutter opening/closing operating portion (actuator 15) id formed by the above motor 60, worm gear 61, worm wheel 62, first pinion gear 63, gear 64, second pinion gear 65, sector gear 66, second output gear 67 and first output gear 68.

Figure 5:
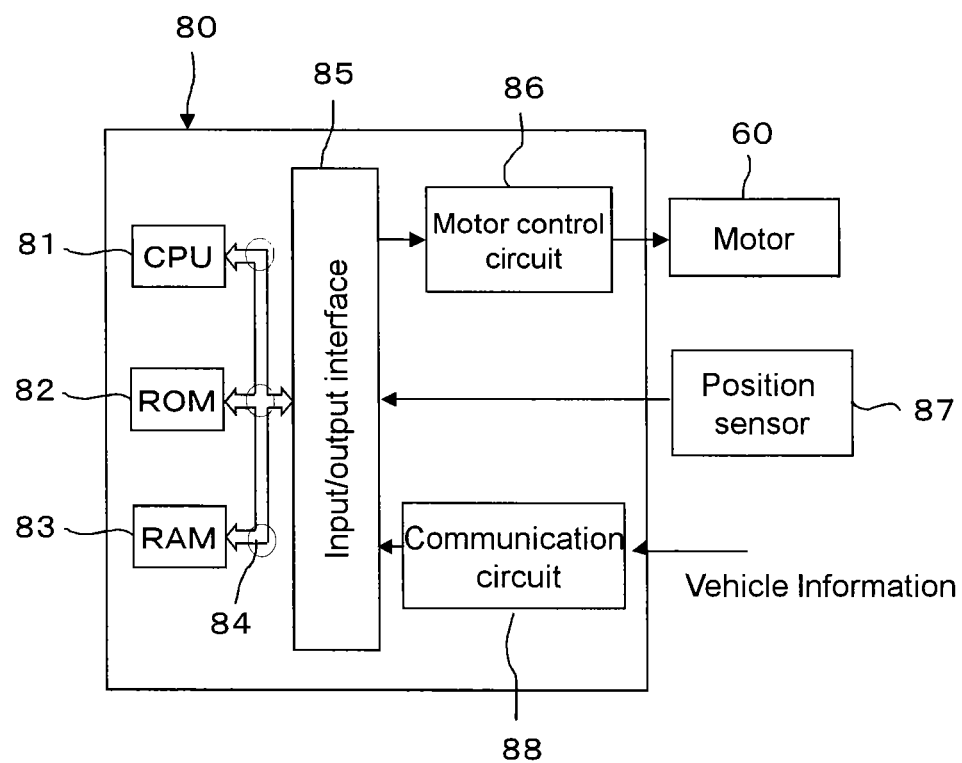
FIG. 5 is a control block view for controlling the grille shutter opening/closing operating portion.

FIG. 5 shows a control device 80 which controls the operation of the shutter opening/closing operating portion 15. The control device 80 includes CPU 81, ROM 82, RAM 83 and the bus line 84 which connects the components of the control device. An input/output interface 85 is connected to the bus line 84. The input/output interface 85 is connected to a motor control circuit 86 for controlling the motor 60 and a position sensor 87 for detecting the rotation position (corresponding to the rotation angle of the motor 60) of the grille shutter 1. Further, the vehicle information, such as vehicle speed, water temperature of the radiator 3, engine (EG) operation state and hybrid motor (HV motor) operation state is inputted to the input/output interface 85 through communication circuit 88.

In the ROM 82, a program for opening and closing the grille shutter 1 is stored and threshold values (Vmax and Vmin) are memorized in the ROM 82 which are used for judging whether the vehicle speed is a low speed, a medium speed or a high speed is judged based on the inputted vehicle speed information. Further, in the ROM 82, a high torque set value set in advance for driving the motor 60 of the shutter opening/closing operating portion 15 by a high torque and a low torque set value set in advance for driving the motor 60 by a low torque are memorized. It is noted here that the low torque set value is set to be a noise level so that the operation noise generated by the contact of the fins 11 through 14 with the end surfaces 7d and 7e upon closing operation of the grille shutter 1 by the motor 60 by the low torque set value may not make the driver of the vehicle feel unpleasant.

In the RAM 83, the inputted vehicle speed is memorized and the position information detected by the position sensor 87 is also memorized. Based on the position information, the state of the grille shutter 1 is judged whether the shutter is in fully closed state or in fully opened state.

An operation of the embodiment explained above will be explained based on the flowchart in FIG. 6. In normal condition, the grille opening 6 is opened. Under this normal state, the rise of temperature of the engine coolant is suppressed by introducing the air into the engine compartment 2 through the grille opening 6 on to the front surface of the radiator 3.

Figure 6:
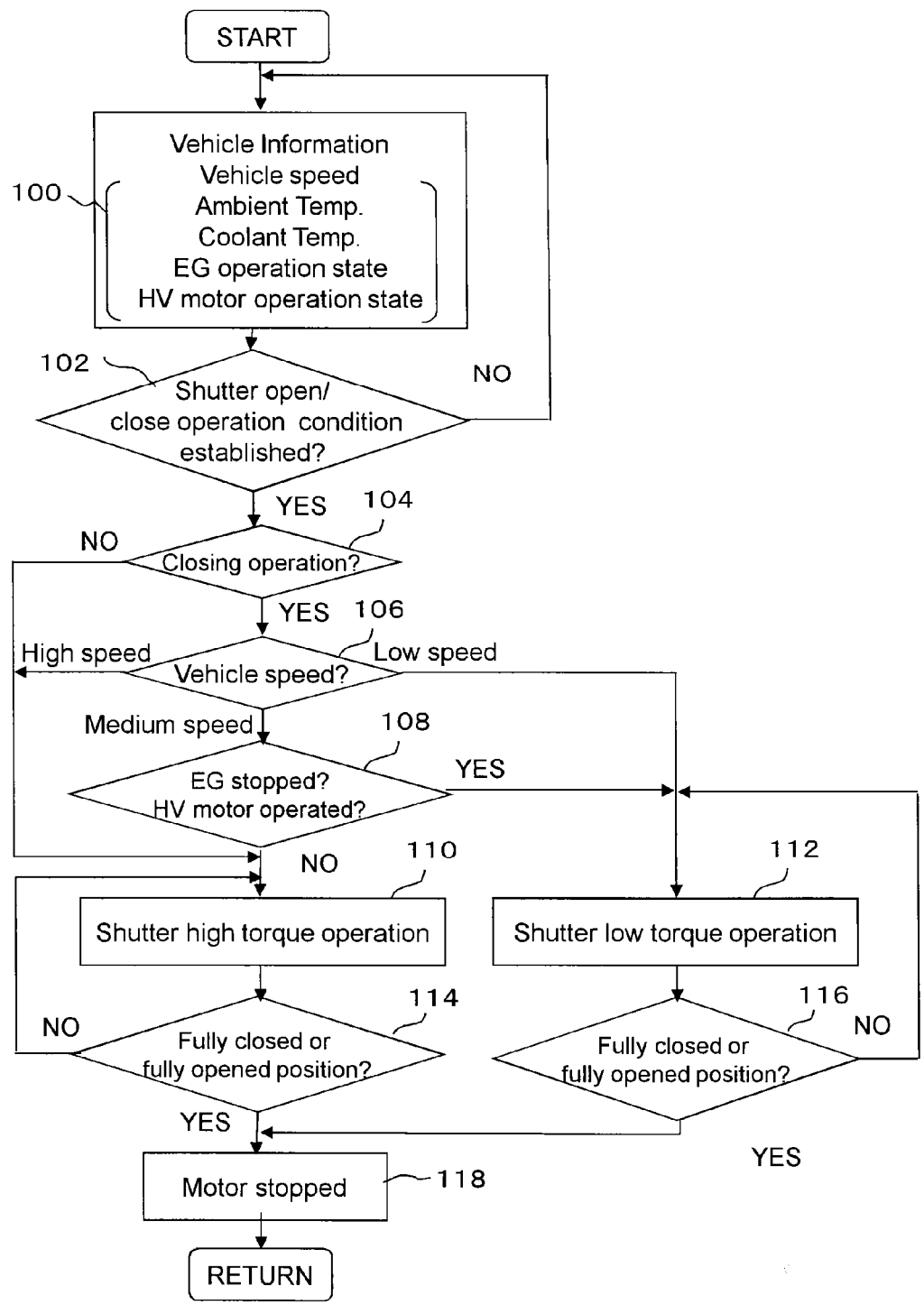
FIG. 6 is a flowchart showing an example of controlling the grille shutter opening/closing operation.

The flowchart in FIG. 6 is started by the engine ignition being turned ON. At step 100, the vehicle information, such as the vehicle speed, ambient temperature, temperature of coolant in the radiator 3, the engine operation state and the hybrid motor operation state is inputted and at the next step 102, it is judged whether the opening/closing operation condition of the grille shutter 1 is established or not based on the inputted vehicle information.

For example, when the temperature of the coolant in the radiator 3 is below the set temperature and the radiator is not necessary to be cooled down further or when the engine is operated and the ambient temperature and the temperature of the radiator are both below the set values, under such conditions, the engine temperature should be raised promptly, the shutter closing condition is judged to be established. Vice versa, if the temperature of the coolant in the radiator 3 exceeds the set value, the shutter opening condition is judged to be established. At the step 102, if the condition is established and the judgment result is "YES", at the step 104, whether the grille shutter 1 is to be closed (closing operation of the shutter 1) or to be opened is judged. If the result is "YES (Closing)", at the next step 106, whether the vehicle speed is the "high speed" faster than the vehicle speed value of Vmax set in advance or is the "low speed" slower than the vehicle speed of Vmin set in advance or the speed is the "medium speed" faster than the vehicle speed value of Vmin but slower than the vehicle speed of Vmax is judged.

At the step 106, if the vehicle speed is judged to be the "high speed", the program goes to step 110 and at the step 110 the motor 60 of the shutter opening/closing operating portion 15 is driven with a preset high torque (high speed operation) to rotate the fins 11 through 14 of the grille shutter 1 about the respective supporting shafts 21 through 24 with a high speed thereby to close the grille opening 6. In other words, when the vehicle speed is high, the operation noise generated at the closing ends of the grille shutter 1 can be neglected and accordingly, the grille shutter 1 performs a high speed closing operation to shorten the time for closing the grille opening.

At the step 106, if the vehicle speed is judged to be low, the program goes to the step 112 and at the step 112, the motor 60 of the shutter opening/closing operating portion 15 is driven with a preset low torque (low speed operation) to rotate the fins 11 through 14 of the grille shutter 1 about the respective supporting shafts 21 through 24 with a low speed thereby to close the grille opening 6. In other words, when the vehicle speed is low, the operation noise generated at the closing ends of the grille shutter 1 cannot be neglected and accordingly, the grille shutter 1 performs a low speed closing operation to reduce the operation noise for closing the grille opening not to make a driver of the vehicle feel unpleasant.

At the step 106, if the vehicle speed is judged to be the medium speed, the program goes to the step 108 and at the step 108, whether the engine is stopped or not is judged and whether the hybrid motor is under operation or not is also judged. If the judgment result is "YES", in other words, when the engine is stopped and the vehicle is running with the hybrid motor. Under such situation, since the running noise is not so large and the program goes to the step 112 and at the step 112, the motor 60 of the shutter opening/closing operating portion 15 is driven with a preset low torque (low speed operation) to rotate the fins 11 through 14 of the grille shutter 1 about the respective supporting shafts 21 through 24 with a low speed thereby to close the grille opening 6. Vice versa, if the judgment result is "NO", in other words, when the vehicle is running with the engine at the step 108, the program goes to step 110 and at the step 110 the motor 60 of the shutter opening/closing operating portion 15 is driven with a preset high torque (high speed operation) to rotate the fins 11 through 14 of the grille shutter 1 about the respective supporting shafts 21 through 24 with a high speed thereby to close the grille opening 6.

At each step 110 and 112, when the grille shutter 1 is operated by a high torque or a low torque, the program goes to the next step 114 or 116. At the step 114 or 116, whether the grille opening 6 is fully opened or fully closed by the grille shutter 1 is judged based on the detecting signal from the position sensor 87. If the judgment result is "YES", the motor 60 is stopped at the step 118 and if the result is "NO" at the step 114 or 116, the program goes back to the step 110 or 112 to repeat the operation until the grille opening 6 is fully closed or fully opened.

On the other hand, under the state that the grille opening 6 is closed, when the temperature of coolant in the radiator 3 rises to or exceeds a preset temperature degree, at the step 102 the condition of opening/closing operation (here, opening operation) of the shutter 1 is judged to be established and the judgment result at the next step 104 becomes "NO". Then the program goes to the step 110 to start opening operation (high speed operation) of the grille shutter 1. Upon the opening operation of the grille shutter 1, the fins 11 through 14 are not brought into contact with the base frame 7 at the opening ends thereof and accordingly, no unpleasant operation noise caused by the contact is generated and the high speed opening operation of the grille shutter 1 can be made with no problem.

The closing operation judging portion is formed by the judging step 104 in which whether the grille shutter 1 should be operated in a closing direction or not based on the inputted vehicle information is judged. The motor torque controlling portion is formed by the controlling step 112 in which the motor 60 (drive source) of the actuator 15 (shutter opening/closing operating portion) is controlled to operate the grille shutter 1 to perform closing operation by a low torque which is lower than the high torque to perform opening operation of the grille shutter, when the shutter is operated in the closing direction under the engine being stopped.

According to the embodiment of the invention, when the grille shutter is operated in a closing direction under the engine being stopped and the hybrid motor being operated, the motor 60 of the shutter opening/closing operating portion 15 is controlled to operate the grille shutter 1 to perform closing operation by a low torque which is lower than the high torque to perform opening operation of the grille shutter. Accordingly, the operating noise generated at the closing ends of the shutter 1 upon the vehicle running by the hybrid motor with a smaller running noise can be reduced not to give the driver of the vehicle an unpleasant feeling.

According to the embodiment, when the vehicle is running with a low speed, the motor 60 of the shutter opening/closing operating portion 15 is controlled to operate the grille shutter 1 by a low torque regardless of the engine operation state (stopped or operated) and when the vehicle is running with a high speed, the motor 60 is controlled to operate the grille shutter 1 by a high torque even upon the closing operation of the grille shutter 1. Further, when the vehicle is running with a medium speed the motor torque for operating the grille shutter is selectively controlled in response to the engine stopping state and the hybrid motor operating state. Thus the opening/closing operation of the grille shutter 1 can be optimally performed in response to the running condition of the hybrid vehicle.

Figure 7:
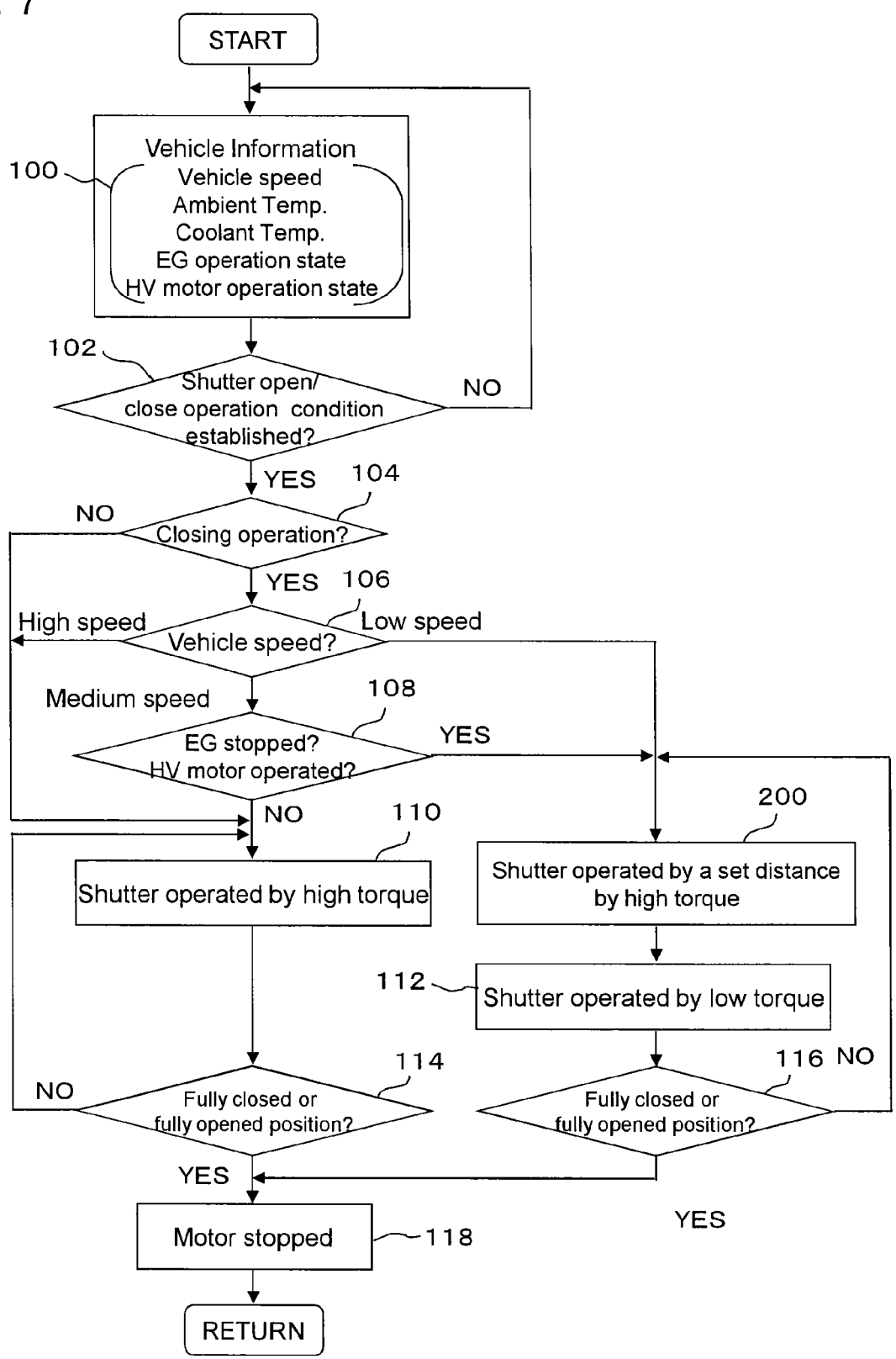
FIG. 7 is a flowchart showing another example of controlling the grille shutter opening/closing operation.

FIG. 7 shows another example flowchart for controlling the opening/closing operation of the grille shutter 1. The difference from the flowchart in FIG. 6 is that upon closing operation of the grille shutter 1, the grille shutter 1 is operated by a high torque until the grille shutter 1 is operated by a predetermined distance (a predetermined angle), prior to the low torque operation.

As shown in FIG. 7, before the step 112 in which the motor is controlled to operate the grille shutter 1 by a low torque, the step 200 is added in which the grille shutter 1 is operated by a high torque until the grille shutter 1 is rotated by a predetermined distance. The other steps of this flowchart are the same to those of the flowchart in FIG. 6 and the same reference numerals or symbols and legends are applied thereto and the explanation thereof is omitted. It is noted here that instead of operating for a predetermined distance, the grille shutter 1 is operated by a high torque for a predetermined time period prior to going to the step 112.

According to the embodiment, not only the operation noise upon closing operation of the grille shutter 1 can be reduced, but also a sure and stable operation can be achieved at the initial stage of the operation of the grille shutter 1. Even when a gear biting is generated in the gear portion of the shutter opening/closing operating portion 15 at the start of the operation, the grille shutter 1 can be surely and stably closed.

Figure 8:
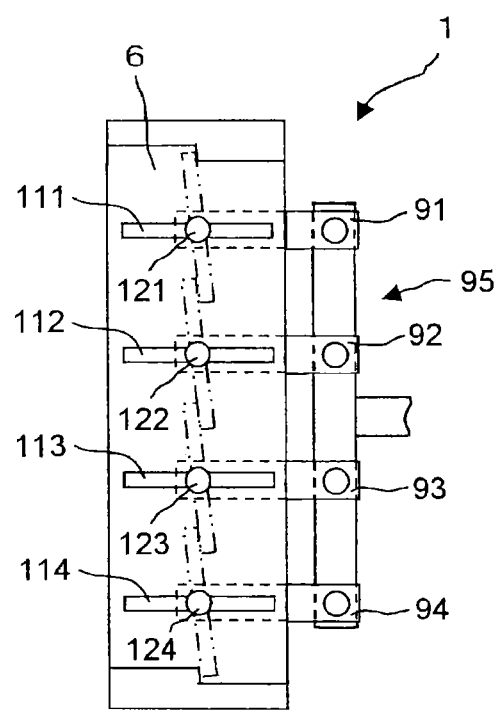
FIG. 8 is a schematic view of the grille shutter according to another embodiment of the invention.

FIG. 8 shows another embodiment of the invention. The grille shutter 1 for opening and closing the grille opening 6 is formed by a plurality of (four in the embodiment in FIG. 8) fins 111 through 114 each of which can be in contact with another in up-down direction. Each fin 111 through 114 has a supporting shaft 121 through 124 at the center thereof and the fins are rotatable about the shafts. Each supporting shaft 121 through 124 is connected to each one end of link members 91 through 94. The link members 91 through 94 are connected to a link operating mechanism 95 with a motor as a drive source. The fins 111 through 114 are rotated together with the link members 91 through 94 by the link operating mechanism 95 thereby to open and close the grille opening 6.

An operating noise is generated by the structure of this modified embodiment. The operating noise is caused by the contact of the each end portion of the fins 111 through 114 to close the grille opening 6 upon closing operation of the grille shutter 1. Accordingly, the invention can be applied to such structure of the grille shutter 1 other than the structure of the grille shutter 1 shown in FIGS. 1 and 2.

The embodiments of the invention are explained with the hybrid vehicle having both engine and hybrid motor. However, this invention is not limited to the application of the hybrid vehicle but is applicable to a gasoline engine or diesel engine vehicle with no idling function (idling-stopping function). According to the grille shutter opening/closing operation of the gasoline or diesel engine vehicle, when the grille shutter 1 is operated to be in closing direction, the motor 60 of the shutter opening/closing operating portion 15 is controlled by a low torque lower than a high torque with which the grille shutter is opened under the engine being stopped at the step 104 corresponding to the closing operation judging portion.

According to the embodiments of the invention explained above, the grille shutter 1 is opened and closed by a high torque or a low torque. However, the grille shutter 1 may be opened and closed with a high speed or a low speed thereby to change the opening or closing torque. Accordingly, the invention includes the motor torque controlling portion for controlling the shutter with a high speed or a low speed.

Further, according to the embodiments explained above, the grille opening 6 is fully opened or fully closed by the grille shutter 1 based on the vehicle information. However, an opening degree of the grille opening 6 may be controlled based on the vehicle speed. For example, if a vehicle is running with a high speed, since the amount of air introduced into the engine compartment is greater than the state that vehicle running with a low speed or a medium speed, a sufficient air flow can be ensured even the area of opening is small. For this reason, by controlling to lessen the opening degree of the grille opening 6, the air resistance can be reduced to thereby improve the fuel efficiency.

Further the embodiment illustrated in FIG. 7, upon the closing operation of the grille shutter 1, the grille shutter is controlled to be operated by a high torque for a predetermined distance or for a predetermined time period. However, in this case by controlling the closing operation of the grille shutter 1 by a high torque just before the closing ends of the shutter, the shortening of operation time can be effectively achieved together with the reduction of the operation noise at the closing ends of the shutter.

On the other hand, according to the embodiment, the motor 60 is used as the drive source of the shutter opening/closing operating portion 15. In addition to the motor, a mechanism for opening and closing the grille shutter 1 by a biasing member such as a spring may be used. Further, in addition to the motor, a vacuum actuator utilizing the intake vacuum of the engine or a hydraulic actuator utilizing the operation fluid used in the engine or a transmission of the vehicle may be used in combination with the motor to control opening and closing of the grille shutter 1.

The embodiments of the invention are explained hitherto, however, the invention is not limited to the explained embodiments but other modifications or alterations of the embodiments can be included in the invention within the subject matter of the invention.

INDUSTRIAL APPLICABILITY OF THE INVENTION

The shutter opening/closing control device according to the embodiment, the device is applied to a vehicle with an engine EG or a hybrid vehicle HV with an engine EG and an HV motor and is comprised of a grille shutter 1 for opening and closing a grille opening 6 through which the air is introduced into an engine compartment 2 of the vehicle, a shutter opening/closing operating portion (actuator 15) with a drive source (motor 60) for operating the grille shutter 1 to open and close, a closing operation judging portion (step 104) for judging whether the grille shutter is to be closed or not based on a vehicle information and a motor torque controlling portion (step 112) for controlling the motor 60 of the actuator 15 to operate the grille shutter by a low torque when the grille shutter is judged to be operated in a closing direction under the engine being stopped. The low torque is lower than a high torque by which the grille shutter is operated when the grille shutter is judged to be operated in an opening direction by the closing operation judging portion.

According to the above feature of the embodiment, upon closing operation of the grille shutter, the motor 60 of the actuator 15 is controlled to close the grille shutter 1 with a torque lower than the high torque needed upon opening operation of the grille shutter when the engine is stopped. Accordingly, the operation noise generated at the closing end of the grille shutter can be reduced when the running noise of the vehicle is small or no running noise is generated and an unpleasant feeling to the driver of the vehicle, which may be caused by such operation noise, may be effectively reduced.

According to a feature of the embodiment, the motor torque controlling portion 112 controls the motor 60 of the actuator 15 to operate the grille shutter 1 until the grille shutter moves by a set distance or for a set period of time by the high torque, prior to the grille shutter being operated by the low torque by the motor 60 of the actuator 15.

According to the feature of the embodiment above, the motor torque controlling portion 112 is controlled to operate the grille shutter to move by a set distance or for a set time period by the high torque prior to an operation of the grille shutter by the low torque by the motor 60 of the actuator 15. According to this structure, not only the reduction of the operation noise at the closing end of the grille shutter, but also a sure and stable closing operation of the grille shutter can be effectively achieved.

According to another feature of the embodiment, the motor torque controlling portion 112 controls the motor 60 to be operated by the low torque regardless of the engine being stopped or not, when a vehicle speed obtained from the vehicle information is equal to or less than a first set speed Vmin set in advance.

According to the feature above, the motor torque controlling portion 112 controls the motor 60 to be operated by the low torque regardless of the engine being stopped or not, when a vehicle speed obtained from the inputted vehicle information is equal to or less than a first set speed Vmin set in advance. Accordingly, the operation noise at the closing end of the grille shutter can be reduced when a vehicle is running with a low speed where a running noise is small even under the engine being operated.

According to a further feature of the embodiment, the motor torque controlling portion 112 controls the motor 60 to be operated by the high torque even when the grille shutter is judged to be operated in the closing direction by the closing operation judging portion 104, when a vehicle speed obtained from the vehicle information is equal to or more than a second set speed Vmax set in advance.

According to the feature above, the motor torque controlling portion 112 controls the motor 60 to be operated by the high torque even when the grille shutter 1 is operated in the closing direction, when a vehicle speed obtained from the vehicle information is equal to or more than a second set speed Vmax set in advance. Accordingly, the operation time for closing the grille shutter 1 can be shortened when the operation noise caused by closing operation can be neglected due to a generation of a larger running noise upon the vehicle running with a high speed. This can achieve a prompt closing operation of the grille shutter as required.

According to a still further feature of the embodiment, regarding to the hybrid vehicle equipped with the engine and the hybrid motor, the motor torque controlling portion 110, 112, 200 selectively controls the motor 60 to be operated by the low torque or the high torque in response to the engine stopping condition and the hybrid motor operating condition 108 when the vehicle speed of the hybrid vehicle obtained from the vehicle information is a medium speed 106 which is higher than the first set speed Vmin but is lower than the second set speed Vmax.

According to the feature of the embodiment above, the motor torque controlling portion 110, 112, 200 selectively controls the motor 60 to be operated by the low torque or the high torque in response to the engine stopping condition and the hybrid motor operating condition when the vehicle speed of the hybrid vehicle obtained from the vehicle information indicates a medium speed which is higher than the first set speed Vmin but is lower than the second set speed Vmax (step 108). Accordingly, the operation noise for closing the grille shutter can be reduced by using the low torque from the drive source when the vehicle is running by the hybrid motor with a medium speed and on the other hand, the time for closing operation of the grille shutter can be shortened by using the high torque from the drive source when the vehicle is running by the engine with a medium speed.

The invention claimed is:

1. A grille shutter opening and closing control device for a vehicle with an engine or a hybrid vehicle with an engine and a hybrid motor, comprising:
   a grille shutter for opening and closing a grille opening through which air is introduced into an engine compartment of the vehicle;
   a shutter opening/closing operating portion with a drive source for operating the grille shutter to open and close;
   a closing operation judging portion for judging whether the grille shutter is to be closed or not, based on an inputted vehicle information; and
   a drive source torque controlling portion configured to control the drive source of the shutter opening/closing operating portion to operate the grille shutter by a low torque in response to
   the grille shutter being judged to be operated in a closing direction and
   the engine being stopped,
   wherein the low torque is lower than a high torque by which the grille shutter is operated when the grille shutter is judged to be operated in an opening direction by the closing operation judging portion.

2. The grille shutter opening and closing control device according to claim 1, wherein,
   the drive source torque controlling portion controls the drive source of the shutter opening/closing operating portion to operate the grille shutter until the grille shutter moves by a set distance or for a set period of time by the high torque, prior to the grille shutter being operated by the low torque by the drive source of the shutter opening/closing operating portion.

3. The grille shutter opening and closing control device according to claim 2, wherein
   the drive source torque controlling portion controls the drive source to be operated by the low torque regardless of the engine being stopped or not, when a vehicle speed obtained from the inputted vehicle information is equal to or less than a first set speed Vmin set in advance.

4. The grille shutter opening and closing control device according to claim 2, wherein,
   the drive source torque controlling portion controls the drive source to be operated by the high torque even when the grille shutter is judged to be operated in the closing direction by the opening/closing operation judging portion, when a vehicle speed obtained from the inputted vehicle information is equal to or more than a second set speed Vmax set in advance.

5. The grille shutter opening and closing control device according to claim 2, wherein
   regarding the hybrid vehicle equipped with the engine and the hybrid motor, the drive source torque controlling portion selectively controls the drive source to be operated by the low torque or the high torque in response to the engine stopping condition and the hybrid motor operating condition when the vehicle speed of the hybrid vehicle obtained from the inputted vehicle information is a medium speed which is higher than the first set speed Vmin but is lower than the second set speed Vmax.

6. The grille shutter opening and closing control device according to claim 1, wherein
   the drive source torque controlling portion controls the drive source to be operated by the low torque regardless of the engine being stopped or not, when a vehicle speed obtained from the inputted vehicle information is equal to or less than a first set speed Vmin set in advance.

7. The grille shutter opening and closing control device according to claim 1, wherein
the drive source torque controlling portion controls the drive source to be operated by the high torque even when the grille shutter is judged to be operated in the closing direction by the opening/closing operation judging portion, when a vehicle speed obtained from the inputted vehicle information is equal to or more than a second set speed Vmax set in advance.

8. The grille shutter opening and closing control device according to claim 1, wherein
regarding the hybrid vehicle equipped with the engine and the hybrid motor, the drive source torque controlling portion selectively controls the drive source to be operated by the low torque or the high torque in response to the engine stopping condition and the hybrid motor operating condition when the vehicle speed of the hybrid vehicle obtained from the inputted vehicle information is a medium speed which is higher than the first set speed Vmin but is lower than the second set speed Vmax.

9. The grille shutter opening and closing control device according to claim 1, wherein regarding the hybrid vehicle equipped with the engine and the hybrid motor, the drive source torque controlling portion controls the drive source of the shutter opening/closing operating portion to operate the grille shutter by the low torque when the grille shutter is judged to be operated in the closing direction under the engine being stopped and the hybrid vehicle operates using the hybrid motor.

\* \* \* \* \*